United States Patent [19]
Shaffer

[11] 3,746,187
[45] July 17, 1973

[54] TRANSFERRING AND STACKING ELONGATED MEMBERS

[75] Inventor: James O. Shaffer, Canfield, Ohio

[73] Assignee: Wean Industries, Inc., Youngstown, Ohio

[22] Filed: July 8, 1971

[21] Appl. No.: 160,936

Related U.S. Application Data

[62] Division of Ser. No. 864,805, Oct. 8, 1969, Pat. No. 3,627,099.

[52] U.S. Cl. .................................. 214/6 H, 271/88
[51] Int. Cl. ........................................... B65g 57/09
[58] Field of Search ................. 214/6 P, 6 DK, 6 G, 214/6 D, 6 H; 271/88

[56] References Cited
UNITED STATES PATENTS

| 2,843,278 | 7/1958 | Qveflander | 214/6 D |
| 2,861,702 | 11/1958 | Mason | 214/6 H |
| 2,870,922 | 1/1959 | Thomson | 214/6 P |

Primary Examiner—Robert J. Spar
Attorney—Williams and Kreske

[57] ABSTRACT

Elongated members, such as bars of metal, are removed from a run-out table, and one or more bars are transferred to star wheel means which lift the bars, one at a time, and deposit them on inclined slide means, the bars slide down the slide means and are stacked on a vertically movable support in rows. The slide means has telescoping sections to compensate for disposition of the bars in rows and the support lowers automatically to deposit the stacked bars, in rows, on car means on which they are banded and delivered to a station for removal.

4 Claims, 14 Drawing Figures

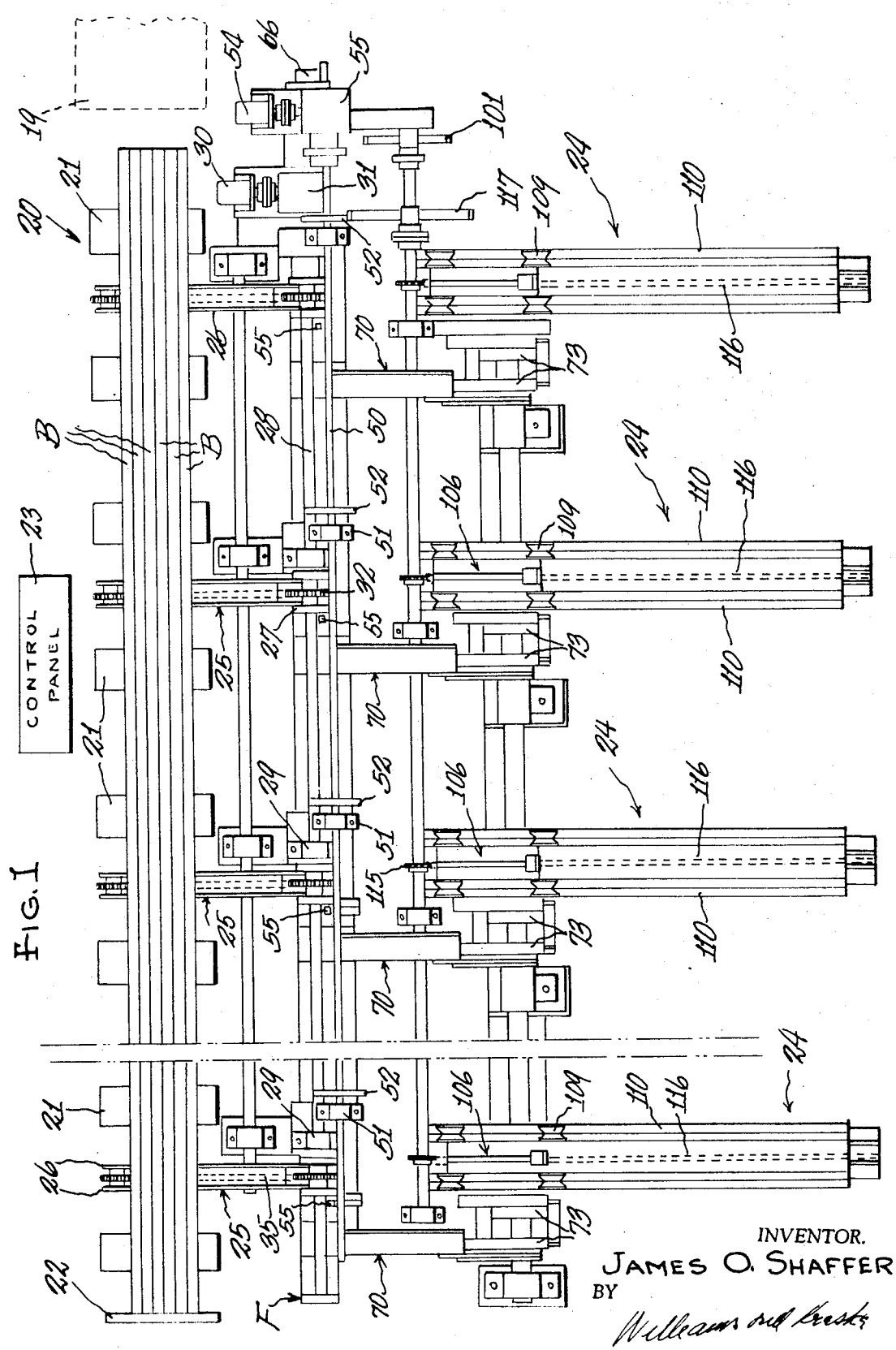

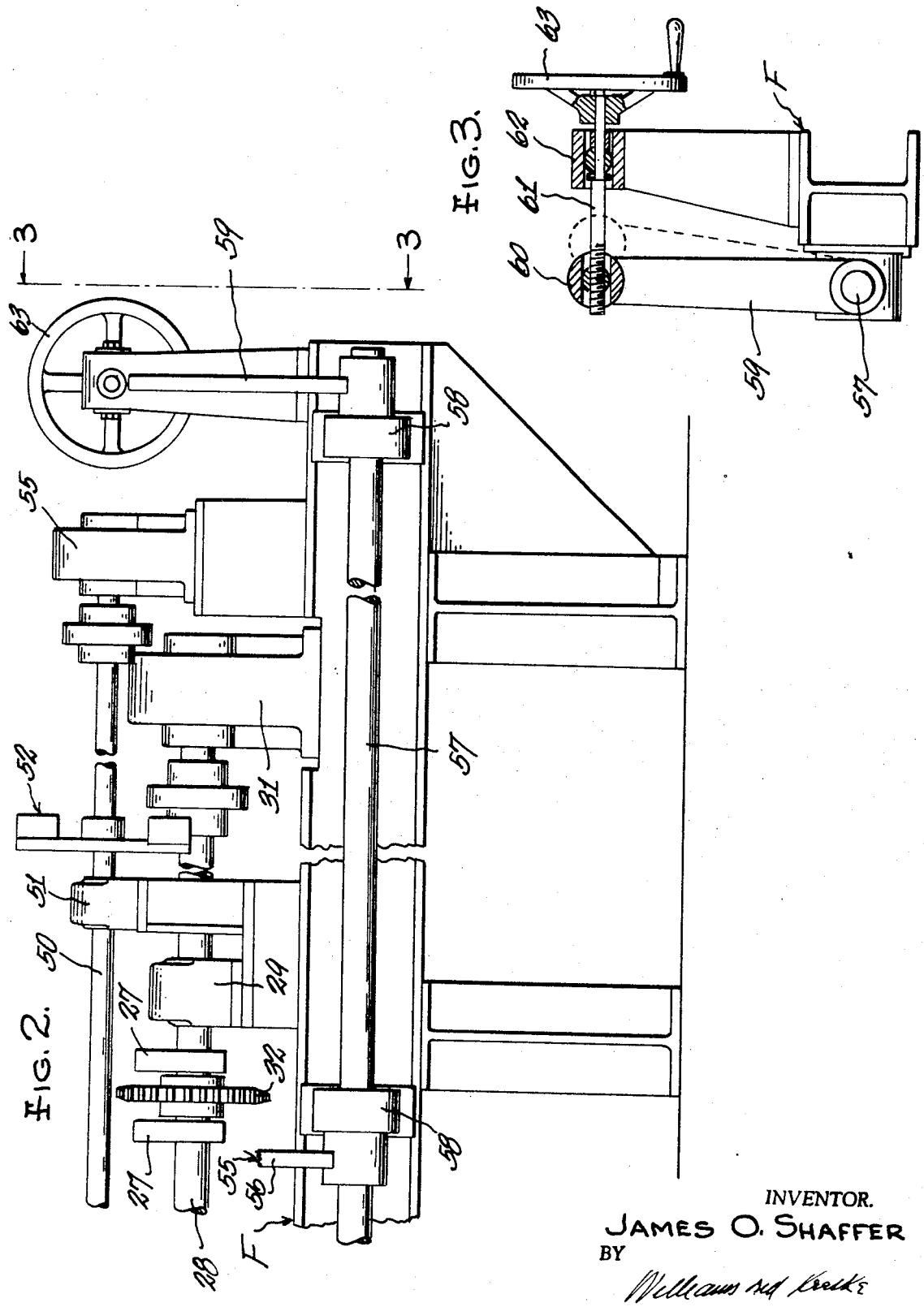

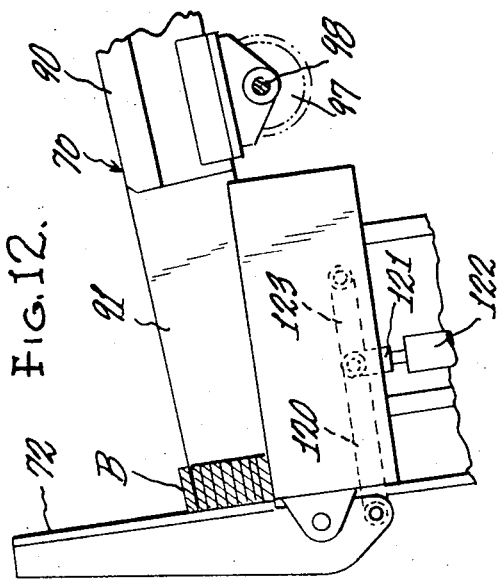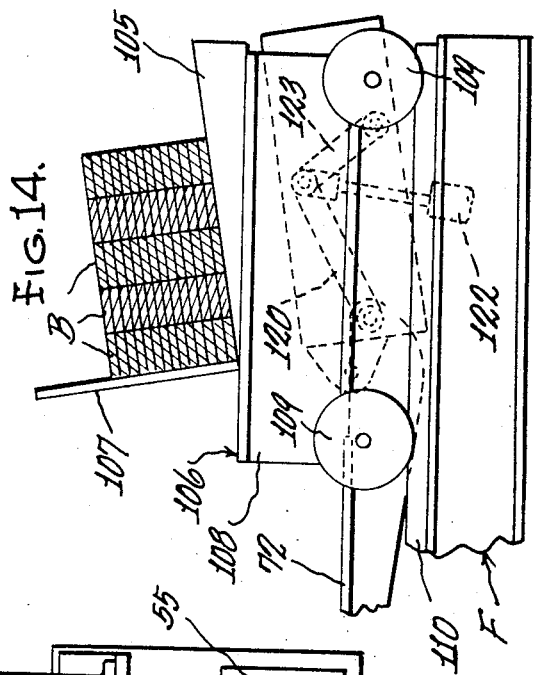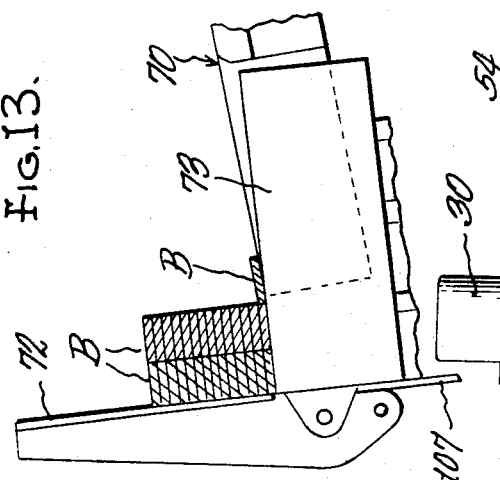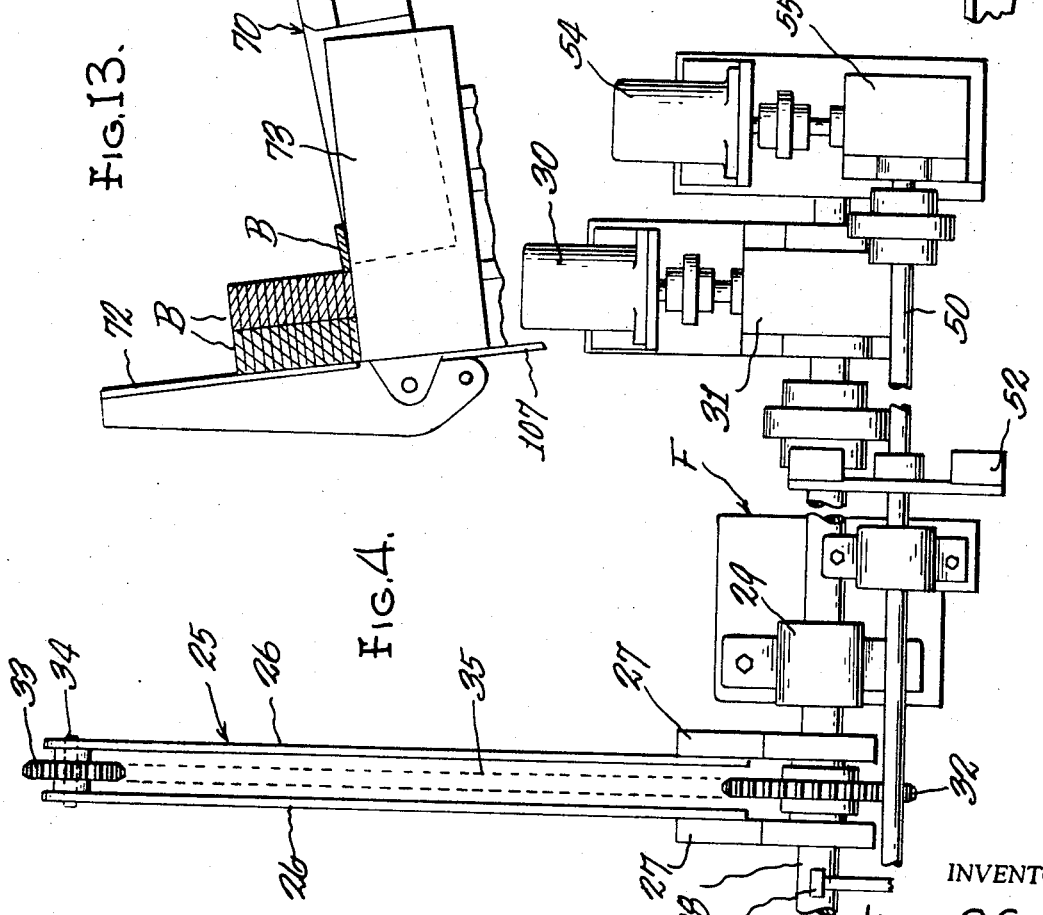

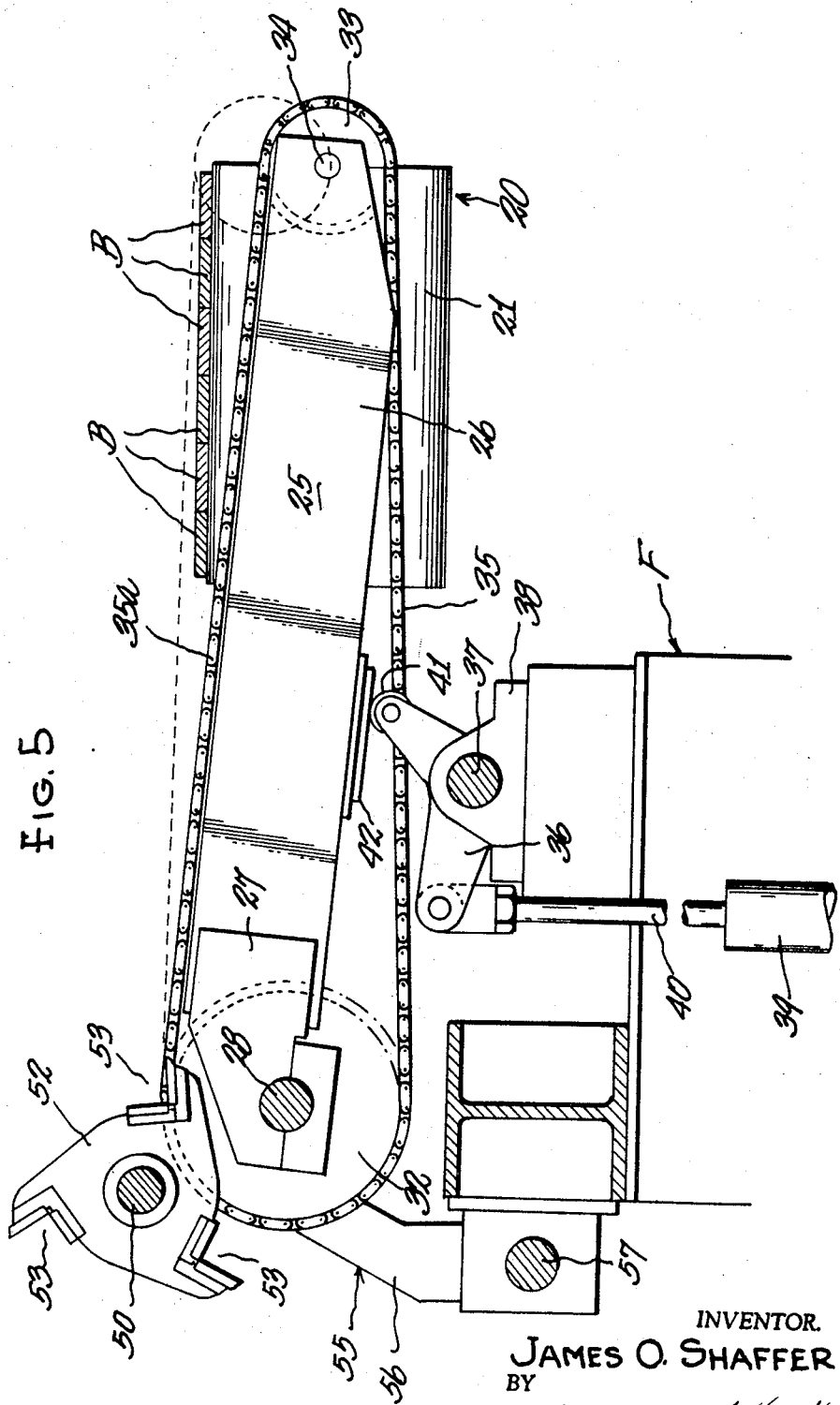

Patented July 17, 1973 3,746,187
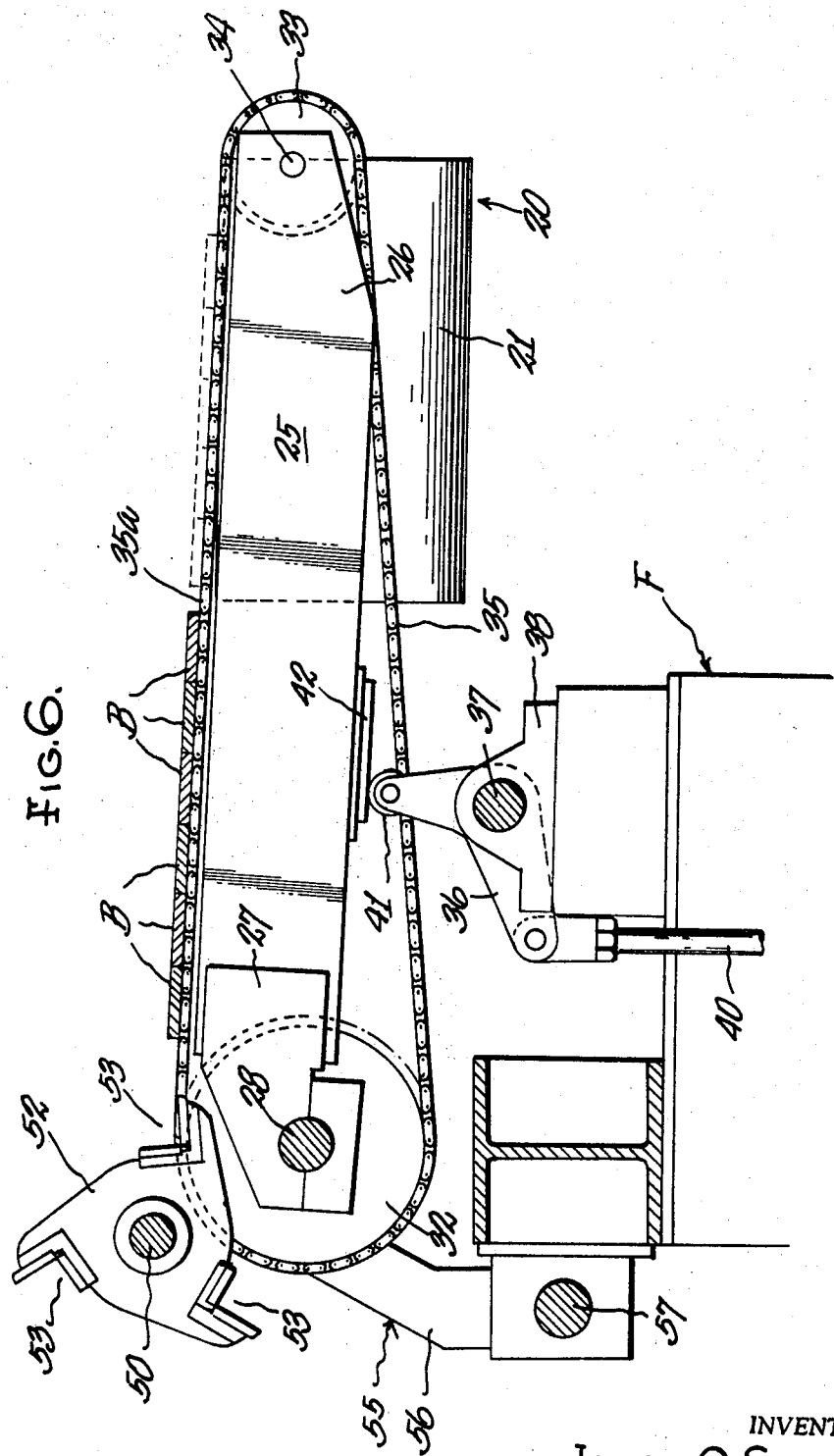
INVENTOR.
JAMES O. SHAFFER
BY
ATTORNEYS

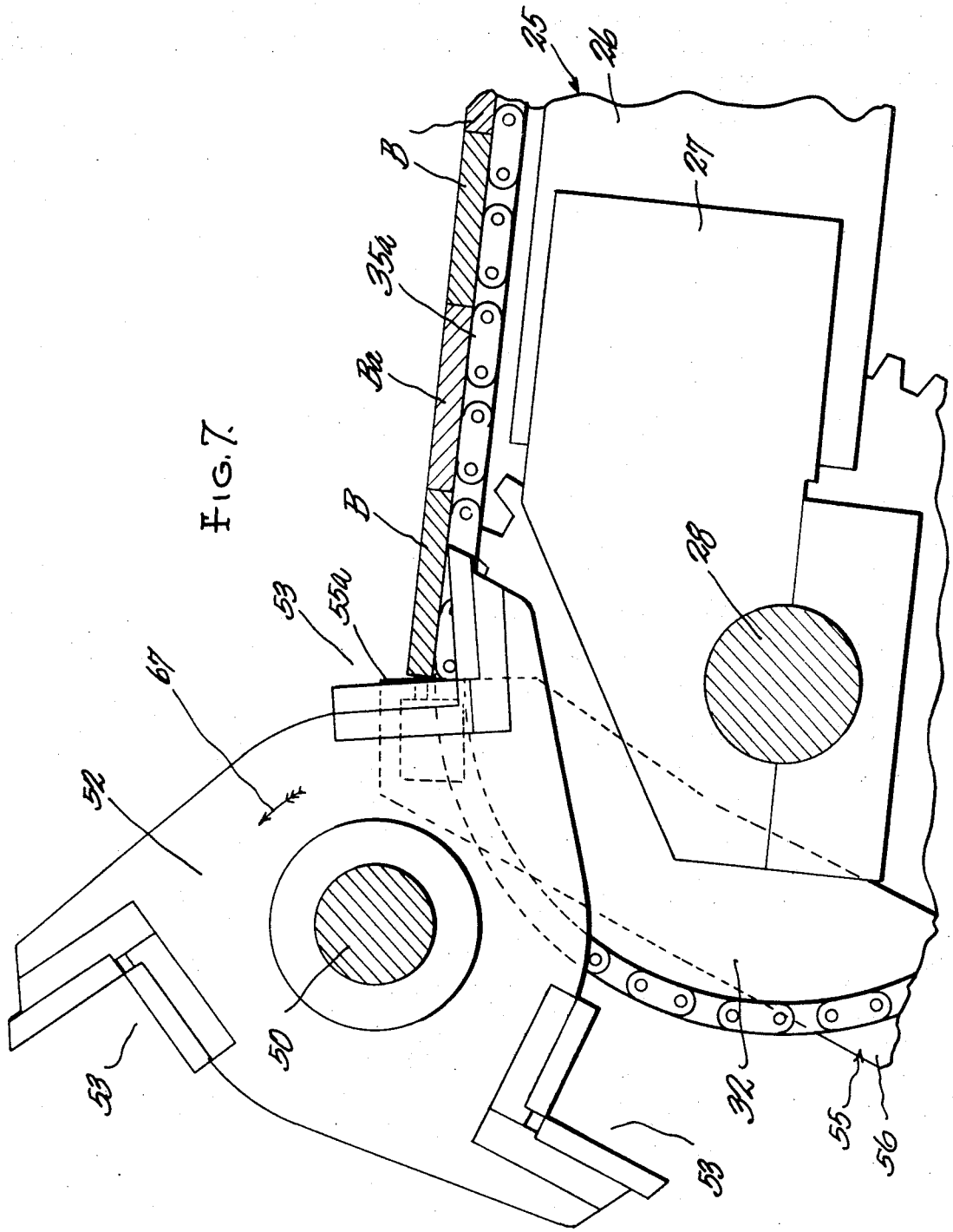

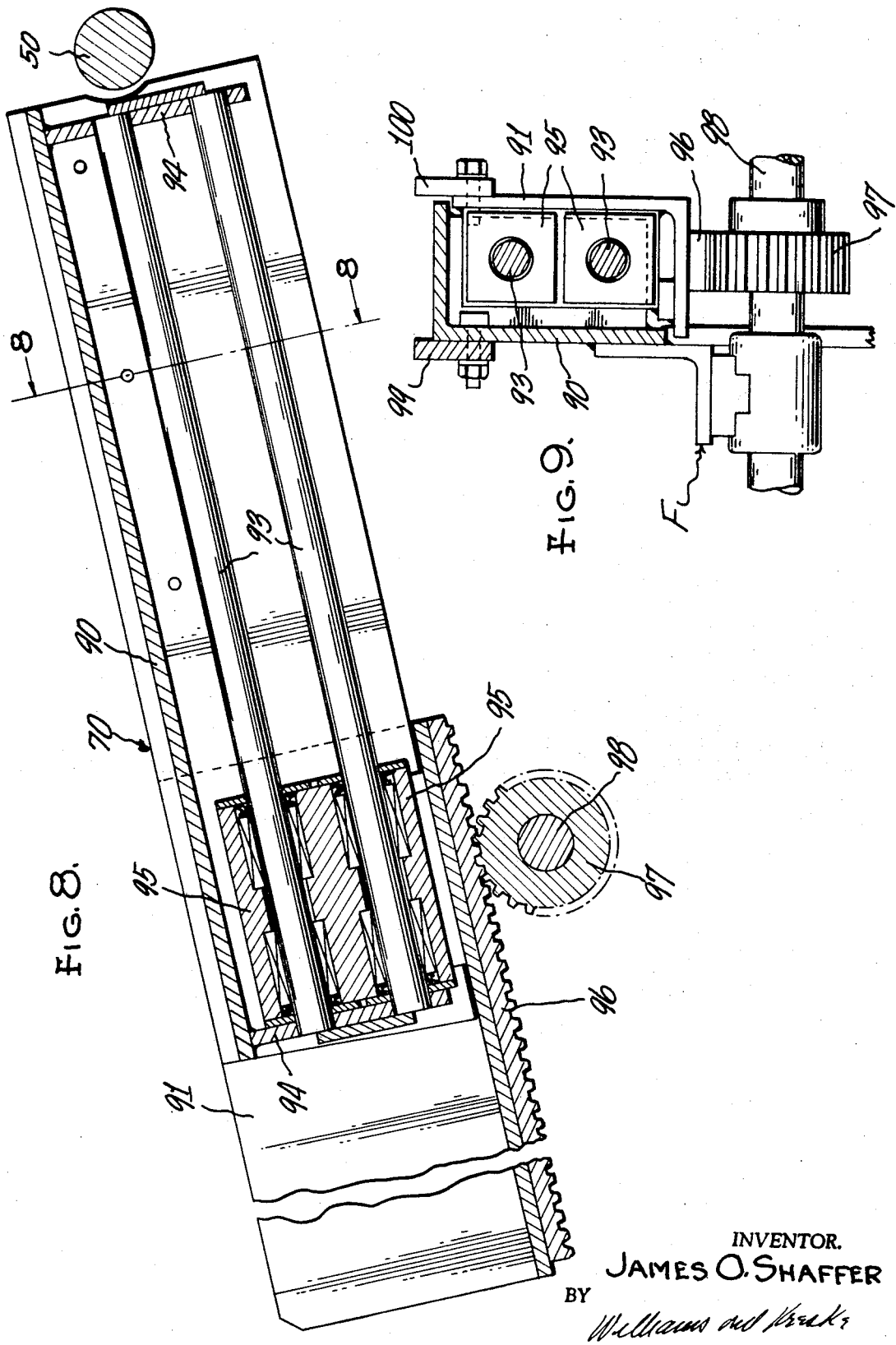

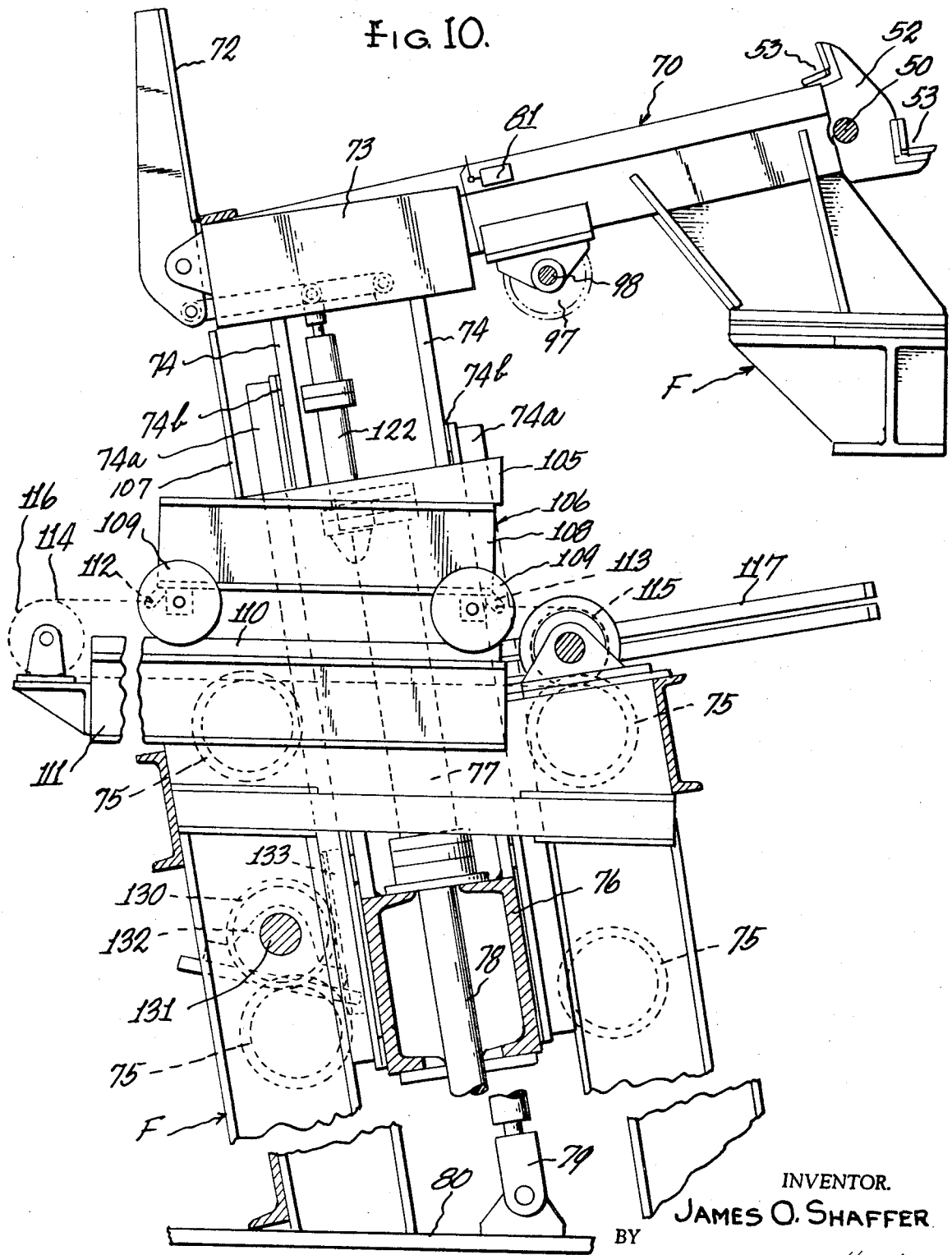

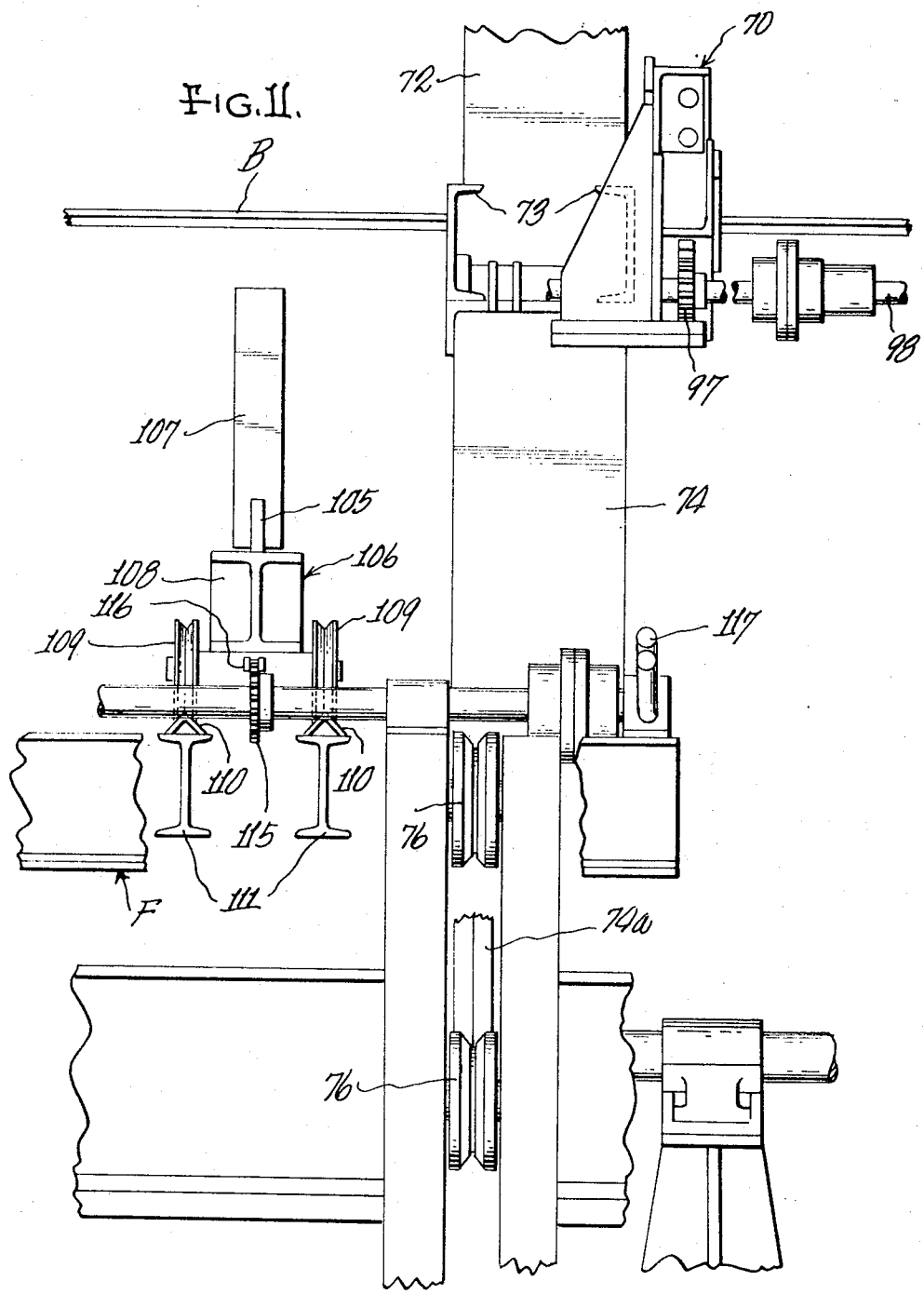

TRANSFERRING AND STACKING ELONGATED MEMBERS

This application is a division of application Ser. No. 864,805, filed Oct. 8, 1969 now U.S. Pat. No. 3,627,099, issued Dec. 14, 1971.

BACKGROUND AND SUMMARY

Prior art constructions with which applicant is familiar remove a group of edge-to-edge disposed bars from a run-out table and deposit the bars, as a group, on a stacking table, one group above the other. Such constructions have been suitable heretofore, but difficulty has been encountered in arranging the bars in well stacked rows and the present invention overcomes the deficiencies of the prior art constructions and provides an efficient bar transfer and stacker device. The present invention removes one or more bars from a run-out table, transfers them to means for lifting the bars, one at a time, and depositing them on slide means along which the bars slide to a support means. The support means is movable downwardly in sequence with the bars delivered by the slide means to stack the bars in a row. After a predetermined number of bars are stacked in a row, the support means is elevated and the slide means retracted an amount equal to the width of a bar to deposit succeeding bars in another row adjoining the first row. When a predetermined number of rows of stacked bars are deposited on the support means, the latter is lowered to deposit the rows of stacked bars on car means where they may be banded and then delivered to a station for removal as a unit.

DESCRIPTION OF DRAWINGS

In the drawings accompanying this description and forming a part of this application, there is shown, for purposes of illustration, an embodiment which my invention may assume, and in these drawings:

FIG. 1 is a plan view of a bar transfer and stacking machine, illustrating a preferred embodiment of my invention, FIG. 2 is a broken side view of a right hand portion of the machine shown in FIG. 1, FIG. 3 is an end view corresponding generally to the line 3—3 of FIG. 2, with parts in section to illustrate construction, FIG. 4 is a top plan view of that portion of the machine shown in FIG. 2, FIG. 5 is an enlarged sectional view, taken transversely of a unit shown in FIG. 1, to illustrate the bar transfer mechanism and star wheel means, FIG. 6 is a view similar to FIG. 5 but showing parts in another position, FIG. 7 is a fragmentary enlarged sectional view illustrating the start wheel means in detail, FIG. 8 is a broken sectional view of the inclined skid means, FIG. 9 is a section corresponding to the line 9—9 of FIG. 8, FIG. 10 is a broken side view of the bar stacking means, parts being shown in section to illustrate construction, FIG. 11 is a broken end view of the bar stacking means shown in FIG. 10, and FIGS. 12, 13 and 14 are detail views illustrating certain operations of the bar stacking means.

DESCRIPTION OF PREFERRED EMBODIMENT

My invention is adapted for use with a run-out table 20 which receives bars B from any suitable source, such as the shear table 19. In the present embodiment, the run-out table comprises a series of drive rolls 21 on which the bars B are received and driven to the left, as viewed in FIG. 1, until their leading ends reach a fixed stop 22. A workman stands at the shear table 19 so as to have a good view of the bars as they travel along the run-out table and when the bars reach the stop, he presses a control button to set in motion a chain of events which are to be described, which events are controlled by electrical means with a control panel 23.

Adjacent to and transversely of the run-out table 20, and cooperable therewith, are a plurality of similar bar handling units 24 which may be of a number to accommodate the greatest length of bar to be handled.

Each device 24 comprises a transfer arm means 25 including an arm formed of a pair of closely spaced plates 26—26 having one end underlying the run-out table 20, and the other end provided with bearing blocks 27 to freely journal such other ends on a shaft 28. The shaft is suitably mounted in bearings 29 carried by the frame F of the machine; and is rotated by a suitable motor 30, through a worm gear reducer 31. The motor 30 may be a Vickers hydraulic motor of the vane type with fixed displacement, and the reducer may be a Hamilton worm gear reducer. A sprocket wheel 32 is fixed to the shaft 28 and is disposed between the bearing blocks 27. Another sprocket wheel 33 is freely rotatable on a shaft 34 carried between the free ends of the plates 26—26. An endless chain 35 is trained over the sprocket wheels 32, 33 and has an upper reach 35a which is disposed above the upper edges of the plates 26—26, as best seen in FIG. 5.

The shaft is rotated to drive each of the chains 35 so that the upper reaches 35a of each travel in a direction from the sprocket wheel 33 to the sprocket wheel 32, that is from right to left with respect to the disposition of parts in FIGS. 5 and 6. All of the transfer arm means 25 are in alignment longitudinally of the shaft 28 and each is swingable about the shaft by means of the bearing blocks 27.

Underlying each set of plates 26—26 is a rocker arm 36, all rocker arms being fixed to a shaft 37, the latter extending the length of the machine, as seen in FIG. 1, and journalled in bearings 38 carried by the frame F of the machine. A hydraulic cylinder 39 is carried by the machine frame, the piston rod 40 of which is journalled to one end of one of the rocker arms 36, the latter having a roller 41 journalled thereon. The roller 41 bears against a wear plate 42 which is connected across the lower edge of the plates 26—26. When fluid under pressure is admitted to the rod end of the cylinder 39, as by means of valve mechanism (not shown) the piston rod 40 is lowered to cause the rocker arm to swing so that the roller 41 swings the plates 26—26 about the axis of the shaft 28 from a normal lower position shown in full lines in FIG. 5 to a raised position shown in dotted lines in this same Figure, and shown in full lines in FIG. 6.

As seen in FIG. 1, the pairs of plates 26—26 of each of the transfer arm means 25 are disposed intermediate adjoining run-out table rollers 21 so that when the free ends of the plates are raised, the upper reach 35a of each of the chains 35 is above the upper level of the rollers and therefore the bars B are engaged by the chain upper reaches and lifted from the rollers.

The motor 30 is capable of being driven at two speeds, a normal slow speed and a higher speed, and valve mechanism (not shown) is utilized to automatically drive the motor 30 at high speed when the arm means 25 have been elevated to dotted line position seen in FIG. 5 and full line position seen in FIG. 6 until such time as the bars B have cleared the rollers in their movement toward the sprocket wheels 32, whereupon the cylinder valve mechanism reverses fluid flow to the cylinder 39 to swing the rocker arm 36 and lower the arm means 25 to the full line position shown in FIG. 5. Simultaneously, the speed control valve mechanism changes the speed of the motor 30 from high speed to its normal low speed, and the bars B are then conveyed toward the sprocket wheels 32 at such slow speed.

Disposed above the shaft 28 is another shaft 50 which also extends the length of the machine, as seen in FIG. 1, such shaft being journalled in bearings 51 carried by the frame F of the machine. A plurality of star wheels 52 are fixed to the shaft 50, each star wheel being adapted to cooperate with a transfer arm means 25 but off-set with respect thereto, as seen in FIG. 1, to avoid interference.

Each star wheel 52 has a plurality of lands 53 (three shown in the disclosed embodiment). The shaft 50 is driven by a motor 54 through a gear reducer 55 and the motor and gear reducer may be of the same make as the motor 30 and reducer 31. Control mechanism (not shown) is employed to rotate the shaft in step-by-step relation and to relate the star wheel lands 53 so that one land of each is in position to receive one of the bars B being transported by the upper chain reach 35a.

A stop arm 55 is provided for each star wheel and in longitudinally off-set relation to the resepective transfer arm means, as seen in FIG. 1, for clearance purposes. The stops arms are aligned and provide stop faces 55a to insure that the leading end of a bar B will be properly positioned in the aligned lands of the star wheel. Each stop comprises an arm 56 fixed to a shaft 57, the latter being journalled in bearings 58, carried by the frame F of the machine. An arm 59 is fixed to the shaft 57 and is disposed at one end thereof to provide for slight rotative movement of the shaft 57 to thereby adjust the position of all stops. The free end of the arm 59 has a ball joint connection 60 with a threaded shaft 61, the latter being mounted for rotation, but held against axial movement, in a support 62 carried by the frame F of the machine. A hand wheel 63 is fixed to the shaft 61 and when it is rotated in a proper direction, it threads the shaft 61 through a nut carried by the ball joint connection 60, and swings the arm 59 to the dotted line position, and thereby correspondingly rotates the shaft 57 and all the stop arms 55, in order to provide for adjustment of stop faces 55a.

Certain, or all the arms 55 carry limit switches 65 adjacent to the stop face 55a in position so that the switch plunger is engaged and depressed by the leading edge of a bar B which is seated in the aligned lands 53 of the star wheel. The switches 65 are in electrical circuit with the controls of the motor 54 so that the star wheel shaft 50 is rotated only when all limit switches are depressed by the leading edge of the bar B to insure proper alignment with the lands 53 of all the star wheels. A rotary cam limit switch 66 is cooperable with the right hand end of the star wheel shaft 50 (see FIG. 1) and is operable to limit rotation of this shaft in step-by-step increments of 120°.

When all the limit switches 65 are engaged and operatedby the leading edge of the adjoining bar B, the motor 50 rotates all the star wheels 52 in a counter-clockwise direction (shown by the arrow 67 in FIG. 7) and the aligned lands 53 into which the leading bar B is deposited by the upper reaches 35a of the chains 35 pick up such leading bar and deposit it on downwardly inclined skid means 70. Meanwhile, the upper reaches of the chains 35 continue to move the bars B toward the star wheels 52 and the stop surfaces 55a hold this bar until succeeding lands 53 of the star wheels are moved to the position shown in FIG. 7 to receive the bar Ba, whereupon the operation of the star wheels is repeated.

The skid means 70 form part of each of the plurality of bar handling units 24 and are longitudinally off-set with respect to the star wheels 52 (as seen in FIG. 1) for clearance purposes. The bars B deposited upon the skid means 70 by the star wheels 52 slide down the latter, partly upon the influence of gravity and partly by the impetus of the depositing action of the star wheels. The bars B slide down the skid means 70 until they engage against a stop plate 72 carried by support which consists a pair of I beams 73—73.

The support 73 of each unit 24 is mounted upon the upper ends of a pair of slides 74—74 and the latter have trackes 74a and are guided in an upright, but inclined manner, as seen in FIG. 10 by rollers 75 carried by the frame F of the machine and engaging the tracks. Shims 74b may be interposed between the slides 74 and the tracks 74a for adjustment purposes. The lower ends of the slides 74 are connected, as by welding, to a box-like beam structure 76. Secured to the box-like structure 76 is the rod end of a hydraulic cylinder 77, the latter extending upwardly between the slides, as seen in FIG. 10. The rod 78 of the cylinder 77 extends downwardly and has a pivoted clevis connection 79 with the base 80 of the frame F of the machine.

As a bar B slides downwardly along the skid means 70 it trips a limit switch 81, which after a predetermined time delay to permit the bar B to engage against the stop plate 72, actuates a control valve (not shown) which exhaust fluid pressure from the cylinder to cause downward movement of the support 73 an amount precisely equal to the thickness of the bars B, so that the bars may be piled one on top of the other to form a stack as shown in FIG. 12. It will be appreciated that the limit switch 81 will be operated each time a bar engages it to incrementally lower the support 73 an amount equal to bar thickness. A bar counting mechanism (not shown) may be utilized to define the number of bars in each stack.

When a single stack of bars B has been effected, the skid means 70 is retracted an amount equal to bar width and fluid under pressure is admitted to the rod end of the cylinder 77 to again elevate the support 73 to a lower position shown in FIG. 13 for another stack of bars B.

Referring particularly to FIGS. 8 and 9 of the drawings, each skid means 70 comprises a pair of elongated angle bars 90 and 91, the bar 90 being fixed to the frame F of the machine in downwardly inclined manner, and the bar 91 being slidably carried by the bar 90 for extension or retraction thereto. The bar 90 supports a pair of longitudinally extending rods 93 by means of web plates 94, and linear bearings 95 are fixed to the bar 91 to guidethe latter longitudinally of the bar 90. A rack 96 is fixed to the lower end of the bar 91 and meshes with a gear 97 carried by a shaft 98. Wear plates 99 and 100 are respectively bolted to the upper ends of the bars 90, 91 to provide ways along which the bars may slide.

A suitable motor 101 (FIG. 1) is connected to the shaft 98 to rotate it and all the gears 97 fixed thereto, and this motor may be hydraulic and may be of a commerically available type known as a Flo-Tork motor. When one stack of bars B has been deposited upon the beams 73, and as the beams are elevated to their upper position, suitable control means (not shown) may energize the motor 101 to cause it to rotate the shaft 98 a precise amount so that the angle bars 91 are retracted (moved to the right as viewed in FIG. 8) a distance equal to the width of a bar, and the stacking operation is continued, with the angle bars 91 being retracted each time a stack of bars B is formed.

When a desired number of stacks of bars are deposited upon the support 73, the latter is lowered, through action of the hydraulic cylinder 77 to a level below the inclined surfaces of wedges 105, as shown in FIG. 14, each wedge forming part of a car 106. The cars 106 are off-set longitudinally of the supports 73 to provide for clearance, as shown in FIG. 1. Each wedge 105 has a backstop 107 against which the first stack of bars engage to hold the stacks in position.

Each of the cars 106 has a body portion 108 formed as an I beam section, the wedge 105 being welded to the upper surface thereof. Four wheels 109 are rotatably carried by the body portion in pairs on opposite sides thereof. The wheels are adapted to roll along tracks 110 which are secured to the upper surfaces of I beams 111 fixed to the frame F of the machine. Each car has lugs 112, 113 disposed at opposite ends, the lug 112 being connected to one end of a chain 114 and the lug 113 being connected to the other chain end. The chain is trained over spaced sprockets 115, 116 which are on shafts journalled in bearings carried by the frame of the machine. A Flo-Tork motor 117 is connected to the shaft to which the sprocket 115 is connected to rotate such sprocket and thus cause the chain to move the car from a position underlying the supports 73 to a position clear of the supports, wherein the bars stacked thereon may be banded and then removed from the cars by a crane or fork lift truck.

The stop plate 72 is pivotally mounted on the support 73 and is movable from its upright position shown in FIGS. 12 and 13 to a generally horizontal position shown in FIG. 14 to provide clearance so that the stacks of bars may be moved by the cars. A link 120 connects the lower end of the stop plate 72 to clevis 121 carried by the rod of a hydraulic cylinder 122, and a link 123 extends from the clevis 121 and is pivoted on an axis crosswise of the supports 73. When fluid under pressure is admitted to the blank end of the cylinder, the cylinder rod is extended to swing both links 120, 123, upwardly to position shown in FIG. 14 and thereby lower the stop plate 72 out of the way of the stacked bars.

Vertical adjustment is provided for all or a predetermined number of supports 73 to provide for limited adjustment of the supports for precise alignment during assembly of the machine. As seen in FIG. 10, a shaft 131 is journalled in bearings 132 carried by the frame F of the machine. The shaft 131 extends lengthwise of the machine and has gears 130 fixed thereto, each gear meshing with a rack 133 carried by a slide 74 of a support 73. The racks are bolted to the respective slide and have elongated holes (not shown) to pass the bolts. At assembly, the bolts are loosened to permit individual adjustment of the slides 74 and thus provide for precise alignment of all the supports 73. Thereafter, the bolts are tightened so that shaft 131 and the gears 130 thereon meshing with the racks 133 maintain such precise alignment.

I claim:

1. Apparatus for handling bars and the like, comprising a run-out table for receiving a longitudinally advancing bar, a transfer arm disposed transversely of said run-out table and having one end normally underlying a bar supported on said run-out table, a conveyor carried between the ends of said transfer arm and having an upper reach normally moving in a direction toward the other end of said transfer arm, said one end of said transfer arm being shiftable upwardly so that said conveyor reach engages under said bar and moves the latter toward said transfer arm other end, means adjacent to the latter for removing said bar from said conveyor, means for receiving the bar so removed comprising skid means inclining downwardly from the means for removing the bar whereby said bars move downwardly along said skid means, and a bar stacking member communicating with the lower end of said skid means to receive bars which move downwardly therealong, said bar stacking member being movable downwardly in increments corresponding to the thickness of a bar, so that bars may be stacked thereon one on top of the other, said bar stacking member being moved upwardly upon completion of a stack of bars, and wherein said skid means comprises members which are relatively extensible and retractable, said skid members being retracted an amount equal to the width of a bar each time said stacking member is moved upwardly for a succeeding stack of bars.

2. Apparatus for handling bars and the like, comprising downwardly inclined guide means for receiving bars and along which said bars slide downwardly, a support at the lower end of said guide means for receiving said bars, and means for lowering said support an amount equal to the thickness of a bar each time a bar is deposited thereon or upon a previously deposited bar to provide for stacking of said bars in single, vertically extending stacks, said support having a backstop against which a first said stack of bars engage, the lower end of said guide means depositing said bars on said support adjacent to said backstop, and said guide means being retractable from said backstop an amount equal to the width of a bar after said first stack of bars is deposited on said support and against said backstop, to permit deposit of succeeding bars in a second stack on said support and against said first stack, and means for retracting said guide means after completion of said first stack.

3. The construction according to claim 2 wherein said guide means comprises an upper fixed member and a lower member retractably mounted on said fixed member.

4. The construction according to claim 2 wherein a car is disposed below said support and wherein the latter is movable downwardly below the level of a surface of said car to deposit the rows of stacked bars on said car, said car being movable along tracks to a position clear of said support wherein said rows of stacked bars may be banded and removed from said car.

* * * * *